United States Patent
Klotz et al.

(10) Patent No.: US 6,791,303 B2
(45) Date of Patent: Sep. 14, 2004

(54) CIRCUIT CONFIGURATION FOR VOLTAGE STABILIZATION

(75) Inventors: Frank Klotz, München (DE); Jürgen Petzoldt, Ilmenau (DE); Axel Rafoth, Rostock (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 10/715,072

(22) Filed: Nov. 17, 2003

(65) Prior Publication Data

US 2004/0100239 A1 May 27, 2004

Related U.S. Application Data

(63) Continuation of application No. PCT/EP02/04055, filed on Apr. 11, 2002.

(30) Foreign Application Priority Data

May 17, 2001 (DE) .......................................... 101 24 114

(51) Int. Cl.[7] .............................. G05F 1/56; G05F 1/59
(52) U.S. Cl. ........................ 323/274; 323/273; 323/284
(58) Field of Search ................................. 323/273, 274, 323/275, 282, 284

(56) References Cited

U.S. PATENT DOCUMENTS

| | | | |
|---|---|---|---|
| 4,541,288 A | | 9/1985 | Kornrumpf et al. |
| 4,801,860 A | * | 1/1989 | Murari et al. ............... 323/274 |
| 4,926,109 A | * | 5/1990 | Koterasawa ................ 323/274 |
| 4,983,905 A | * | 1/1991 | Sano et al. ................. 323/274 |
| 4,983,955 A | * | 1/1991 | Ham et al. .................. 340/664 |

FOREIGN PATENT DOCUMENTS

| | | |
|---|---|---|
| DE | 197 41 430 A1 | 4/1999 |
| DE | 199 40 284 C1 | 9/2000 |
| DE | 199 39 601 A1 | 3/2001 |
| EP | 0 892 332 A1 | 1/1999 |

OTHER PUBLICATIONS

R. Köstner et al.: "Elektronische Schaltungen" [electronic circuits], *Studienbücher der technischen Wissenschaften*, Hanser Verlag, Germany, 1993, pp. 264–286.

Mingjuan Zhu et al.: "Design and Evaluation of an Active Ripple Filter with Rogowski–Coil Current Sensing", *Massachusetts Institute of Technology*, Cambridge, MA, not dated, 7 pgs.

* cited by examiner

*Primary Examiner*—Bao Q. Vu
(74) *Attorney, Agent, or Firm*—Laurence A. Greenberg; Werner H. Stemer; Ralph E. Locher

(57) ABSTRACT

A voltage stabilization circuit is configured between two signal lines. Each of the signal lines carries a signal, and an interference signal is superimposed on at least one of the signals. The voltage stabilization circuit includes an amplifier circuit that provides an anti-phase signal obtained as an amplified difference between the interference signal and a reference signal. The anti-phase signal has a phase that is opposite the phase of the interference signal. The configuration further includes a matching circuit, which is connected in series with the amplifier circuit, and which generates a compensation signal from the anti-phase signal and superimposes the compensation signal on the signal that is superimposed with the interference signal.

14 Claims, 4 Drawing Sheets

CIRCUIT CONFIGURATION FOR VOLTAGE STABILIZATION

CROSS-REFERENCE TO RELATED APPLICATION

This application is a continuation of copending International Application No. PCT/EP02/04055, filed Apr. 11, 2002, which designated the United States and was not published in English.

BACKGROUND OF THE INVENTION

Field of the Invention

The invention relates to a circuit configuration for voltage stabilization.

The operation of electronic circuits generally requires one or two DC voltages. The DC voltages are almost always obtained directly from the AC mains voltage by using power supply circuits. In the simplest case, the power supply circuits include a mains transformer, a rectifier and a filter circuit. However, nowadays, switched-mode power supplies are increasingly being used within the power supply circuits in order to reduce power supply losses. However, the operation of the electronic circuit requires that the DC voltage supplied by the power supply or the switched-mode power supply complies with a required voltage value as precisely as possible. However, in clocked circuit configurations in power electronics, voltage fluctuations can arise on the connection lines between the mains connection and the load connection. The voltage fluctuations are caused by mains voltage fluctuations, temperature fluctuations and load current fluctuations. Such voltage fluctuations are undesirable since they result in increased EMC emissions requiring radio interference suppressions, an increased power loss, excitation of the surroundings, and instabilities of the entire circuit configuration.

However, despite these voltage fluctuations, the DC voltage necessary for operating the electronic circuit should be constant to the greatest possible extent within a certain tolerance, for example between 0.5 and 5%. For these reasons, the output voltage of the rectifier circuits arranged within the power supply circuits is not directly suitable as an operating voltage for an electronic circuit, but rather must be stabilized and smoothed by a circuit configuration for voltage stabilization connected downstream.

In the simplest case, such a voltage stabilization circuit is produced from a linear voltage regulator which is connected downstream of the mains transformer and the rectifier and which may replace a filter circuit, for example. Such voltage regulators suppress the input voltage fluctuations and correct load current fluctuations that possibly occur. In the case of a switched-mode power supply, the customary mains transformer is dispensed with, as is known. The mains voltage is rectified directly in this case and this DC voltage is brought to the desired output voltage and stabilized by a DC voltage converter or a switching regulator.

Such circuits for voltage realization are known in many cases and are described, for example, in R. Köstner, A. Möschwitzer, "Elektronische Schaltungen" ["Electronic circuits"], Karl-Hanser-Verlag, 1993, in particular on pages 264 to 286.

These simple circuits for voltage stabilization which are realized by a voltage regulator or by the functionality of the switched-mode power supply itself for the most part do not satisfy, or do not satisfy well enough, the requirements which have to be made of a circuit for voltage stabilization. Therefore, in addition or as an alternative to the voltage regulators, passive or active filters for active compensation of the voltage fluctuations are also often found in clocked circuits of power electronics. Although good voltage stabilization can in many cases be achieved with active filtering, the outlay for such a voltage stabilizer is often so great that it is not realized for economic reasons.

All of the abovementioned circuits for voltage stabilization have the inherent disadvantage that they are arranged at least partially directly in the respective output line on which an interference level to be compensated runs, in order thus to ensure dynamic correction or compensation of the interference signal. As a result, however, the stabilization circuit is no longer free of perturbations since the components of the circuit for voltage stabilization which are arranged in the load path always also have an influence on the signal to be stabilized.

The article "Design and Evaluation of an Active Ripple Filter with Rogowski-Coil Current Sensing", by M. Zhu et al. of the Massachusetts Institute of Technology describes an active filter for voltage stabilization, which does not have the described disadvantage. In this case, an inductive measurement pick-up for detecting the interference signal is provided. A compensation signal is generated from the interference signal, which compensation signal is fed in inductively. The direct electrical isolation of the circuit configuration for voltage stabilization from the corresponding connection lines with the interference signal avoids a direct coupling and thus a direct perturbation of the circuit for voltage stabilization on the load circuit. However, the bandwidth of the circuit for voltage stabilization is limited on account of the direct electrical isolation with a ferrite. Furthermore, a high system loading exists due to the current measurement and the increased power consumption as a result of this. This can be eliminated only through a disproportionately high outlay on circuitry. If this is not done, then a slight temporal offset exists at the measurement frequency. Therefore, such a circuit for voltage stabilization is suitable only for relatively low frequencies in the range up to 125 kHz.

In many cases, however, it is necessary also to correct interference levels with higher frequencies. Such higher-frequency interference frequencies become apparent particularly seriously if they are in the frequency band of the radio frequencies, i.e. in the range of about 1 MHz and above, since an interfering noise is thereby superposed on the radio reception, which should understandably be avoided particularly in the case of automotive applications.

SUMMARY OF THE INVENTION

It is accordingly an object of the invention to provide a circuit configuration for voltage stabilization which overcomes the above-mentioned disadvantages of the prior art apparatus of this general type.

In particular, it is an object of the invention to provide a circuit configuration for voltage stabilization which stabilizes an output signal superposed with an interference level on an output line as much as possible in a manner free of perturbations.

With the foregoing and other objects in view there is provided, in accordance with the invention, a voltage stabilization circuit configured between two signal lines each carrying a respective signal. An interference signal is superposed on the signal of at least one of the signal lines. The voltage stabilization circuit has an amplifier circuit that obtains a difference between a signal derived from the interference signal and a reference signal, amplifies the difference and generates an antiphase signal having a phase that is opposite that of the interference signal. The voltage stabilization circuit has a matching circuit for potential matching connected downstream of the amplifier circuit. The matching circuit generates a compensation signal from the antiphase signal. The compensation signal is superposed on the signal on which the interference potential is superposed.

The voltage stabilization circuit enables dynamic and perturbation-free compensation of an interference level by using an active compensation circuit which detects the interference level as a difference with respect to a freely settable reference signal, amplifies it using a differential amplifier and feeds it in antiphase onto the connection line or lines superposed with the interference level in the form of a compensation current or a compensation voltage. In this case, the voltage stabilization circuit only taps off the interference signal or the signal on the connection line affected by interference and superposes a compensation signal on the connection line affected by interference. Otherwise, however, the load circuit remains unaffected by the stabilization circuit. The voltage stabilization circuit advantageously has no components in the signal path of the connection line affected by interference. The result is that the stabilization circuit does not cause perturbations on the connection line. The dynamic range and the frequency range of the stabilization circuit in which the circuit according to the invention operates optimally can be achieved by suitably dimensioning the stabilization circuit—that is to say of the differential amplifier, the matching circuit, the measurement circuit, the technology, the transition frequency, the supply voltage.

Other features which are considered as characteristic for the invention are set forth in the appended claims.

Although the invention is illustrated and described herein as embodied in a circuit configuration for voltage stabilization, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

In all the figures of the drawings, identical or functionally identical elements and signals are provided with identical reference symbols, unless stated otherwise.

Figure 1:
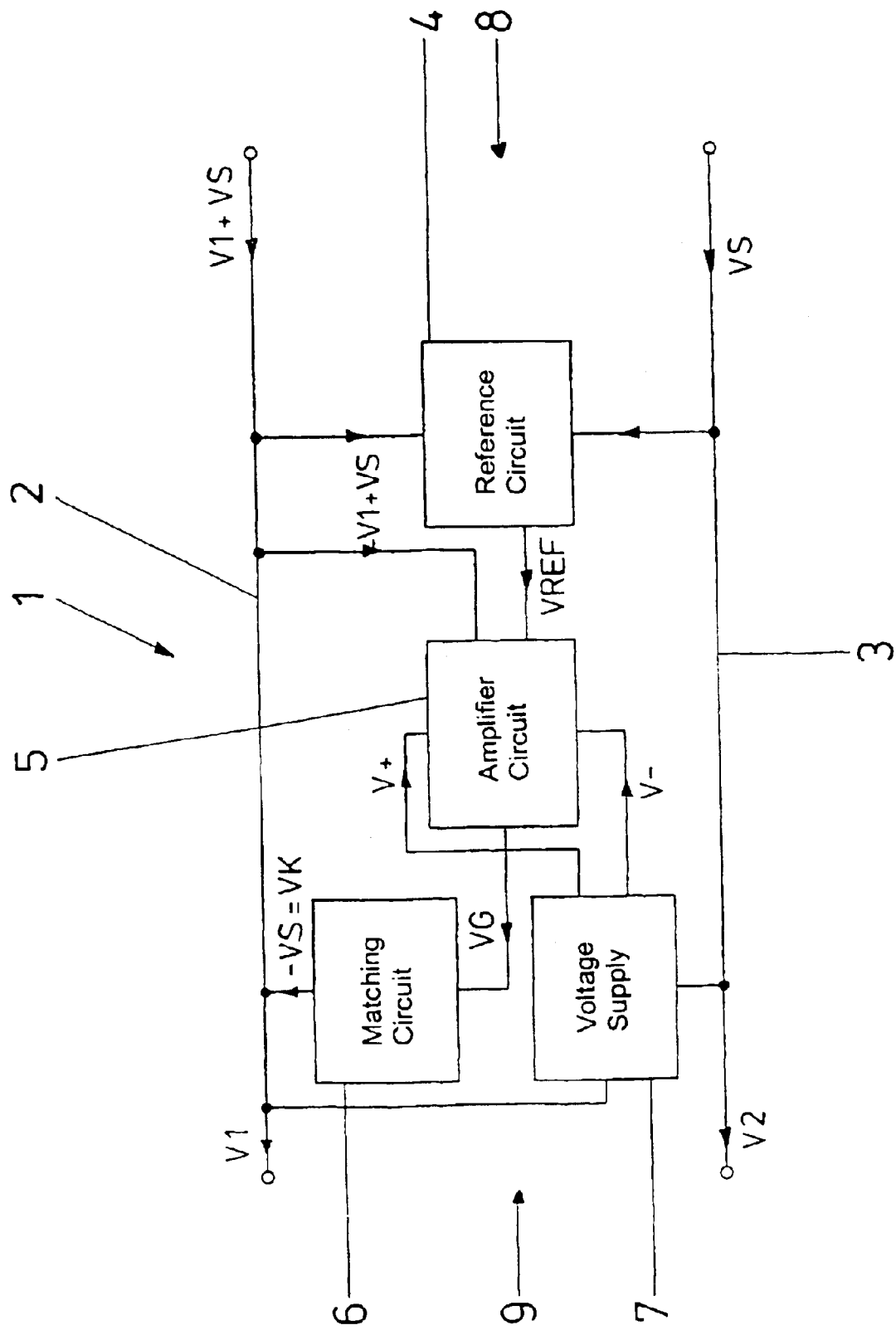
FIG. 1 is a block diagram provided for explaining the principle of operation of a circuit for voltage stabilization.

Referring now to the figures of the drawing in detail and first, particularly, to FIG. 1 thereof, there is shown a block diagram of a voltage stabilization circuit 1 arranged between two signal lines 2, 3. The two signal lines 2, 3 in this case form the power path of an electronic circuit (not illustrated in the figures), the first signal line 2 having a first signal V1 and the second signal line 3 having a second signal V2. The signals V1, V2 may be either a current signal or a voltage signal. Equally, the signals V1, V2 may be a DC signal, an AC signal or an AC signal superposed with a DC signal. Signal line 2, 3 need not necessarily be understood as a line, rather it may also be understood to be a ground area (in this respect, also see FIG. 2) or a potential area.

An undesirable interference signal VS is often applied to at least one of the two signal lines 2, 3. This interference signal is intended to be eliminated by the circuit 1 for voltage stabilization. It shall be assumed below that an interference level VS is applied only to the signal line 2. The signal line 2 is also referred to below as line affected by interference. The signal running on the signal line 2, which signal results from the superposition of the signal V1 with the interference level VS, is then referred to as signal V1+VS affected by interference.

For the purpose of voltage stabilization, the circuit 1 has a reference circuit 4, an amplifier circuit 5 and a matching circuit 6. The reference circuit 4 is connected between the signal lines 2, 3 at an input 8 of the circuit 1 and generates a reference signal VREF from the signals V1, V2. However, the reference circuit 4 need not necessarily be arranged between the signal lines 2, 3, but rather can generate the reference signal VREF in any other manner desired. The reference signal VREF is output from the reference circuit 4.

The amplifier circuit 5 is likewise connected to the signal line 2 affected by interference and also to the output of the reference circuit 4. The amplifier circuit 5 is thus fed the signal V1+VS affected by interference (or a signal derived therefrom) and also the reference signal VREF. The amplifier circuit 5 is furthermore connected to a voltage supply 7 connected between the signal lines 2, 3. The voltage supply 7 supplies the amplifier circuit 5 with supply potentials V+, V−. The amplifier circuit 5 generates and outputs a signal VG which is in antiphase with respect to the interference signal VS. The antiphase signal VG is fed to the matching circuit 6 connected downstream. On the output side, the matching circuit 6 is connected to the signal line 2 affected by interference. The matching circuit 6 generates, from the antiphase signal VG, a compensation signal VK≈−VS, which essentially corresponds to the interference signal VS with regard to its amplitude, but has an opposite sign. The superposition of the compensation signal VK with the signal V1+VS affected by interference has the effect that a signal V1 that is now no longer affected by interference results on the first signal line 2 at the output 9. This signal V1 can be fed to the electronic circuit.

The basic circuit in accordance with FIG. 1 thus includes a measurement circuit for selectively setting the frequency to be compensated or the frequency range to be compensated, a differential amplifier and possibly an amplifier that is connected downstream thereof and that includes e.g. bipolar or MOS transistors, a voltage supply, and a matching circuit. A matching circuit should be understood to be a circuit for potential and/or impedance matching. The arrangement of these circuit elements makes it possible, according to the invention, to realize a selective RF filter together with a highly dynamic voltage stabilizer or voltage regulator which, in an advantageous manner, is not arranged directly in the power current path, i.e. in the signal lines 2, 3. A voltage stabilization or voltage regulation that is free of perturbations to the greatest possible extent is possible in this way.

In FIG. 1, the voltage supply 7 is connected between the signal lines 2, 3. However, the supply potentials V+, V− required for the supply of the amplifier circuit 5 can also be generated in any other manner desired, as will be explained below with reference to FIGS. 2 to 4. In particular, the voltage supply 7 could also be completely decoupled from the signal lines 2, 3 and could be designed as a local energy supply device.

Three exemplary embodiments for realizing a circuit configuration for voltage stabilization are described below with reference to FIGS. 2 to 4.

Figure 2:
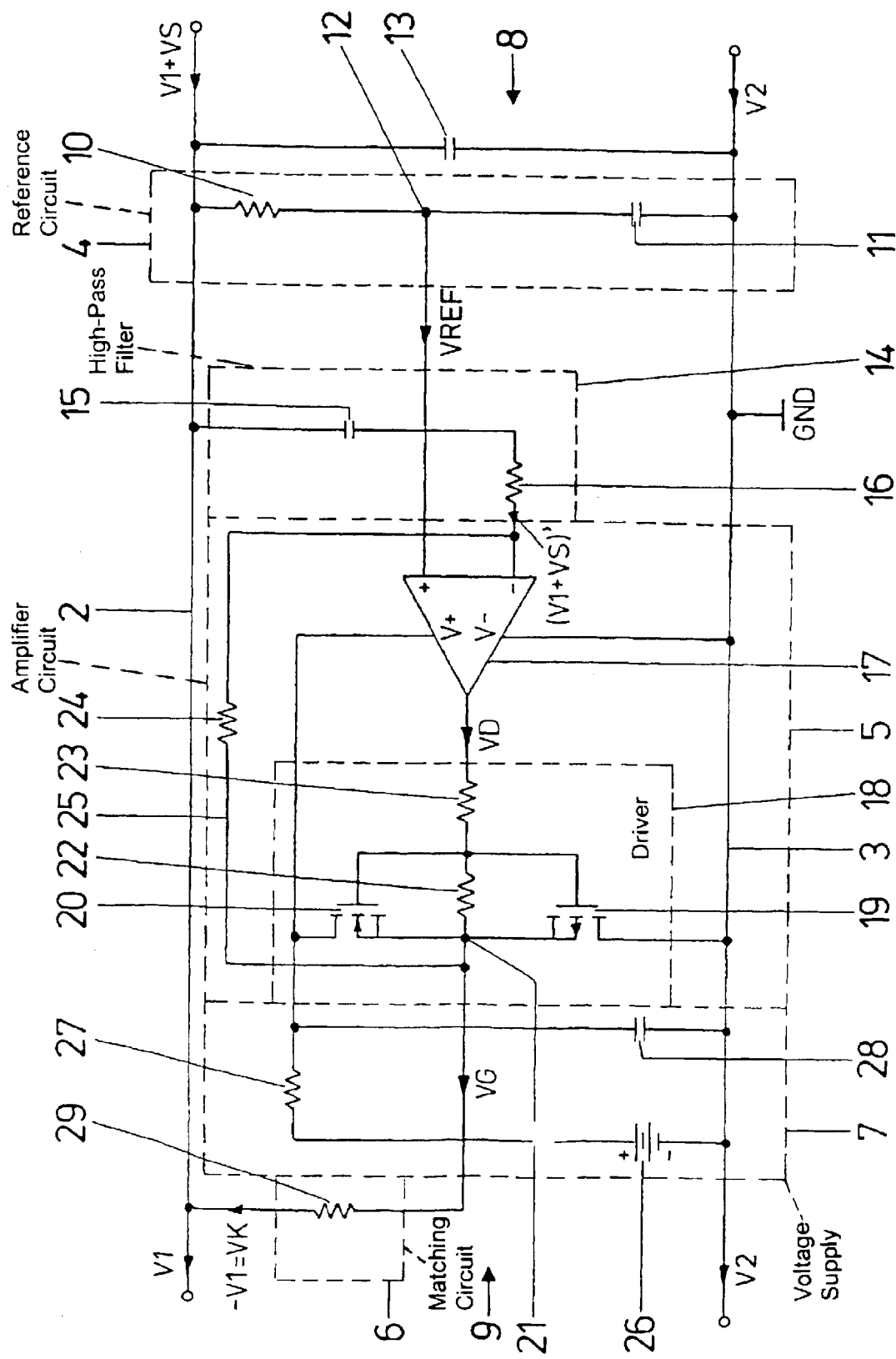
FIG. 2 is a circuit diagram of a first, general exemplary embodiment of the circuit for voltage stabilization.

In the example in FIG. 2, it shall be assumed that the signal to be transmitted over the first signal line 2 is a voltage potential of 12 volts. By contrast, the second signal line 3 has the reference ground GND potential or 0 volts.

In FIG. 2, the reference circuit 4 includes a series circuit formed by a resistor 10 and a capacitor 11, which are connected between the signal lines 2, 3 and at whose centre tap 12 the reference signal VREF can be tapped off. The reference circuit 4 thus forms a low-pass filter. A further capacitor 13 is connected between the signal lines 2, 3 in parallel with the series circuit formed by resistor 10 and capacitor 11. Although the capacitor 13 is not relevant to the principle of the voltage stabilization according to the invention, providing a capacitor 13 at the input 8 of the voltage stabilization circuit 1 is advantageous since relatively small potential spikes on the signal lines 2, 3 can thereby already be filtered out before the stabilization. Furthermore, a high-pass filter 14 including a capacitor 15 and resistor 16 is connected between the first signal line 2 and the amplifier circuit 5. The high-pass filter 14 generates a signal (V1+VS)' derived from the signal V1+VS affected by interference.

The amplifier circuit 5 has a differential amplifier 17 and a driver 18 connected downstream of the differential amplifier 17. The reference signal VREF is fed to the positive input (+) of the differential amplifier 17 and the signal (V1+V2)' is fed to the negative input (−). On the basis thereof the differential amplifier 17 generates a differential signal VD, which is fed to the driver 18 connected downstream. If the differential signal of the differential amplifier 17 is also intended additionally to be amplified, the driver 18 may also be designed as an amplifier. In the present example, the driver 18 is designed as a single-stage push-pull output stage and has in each case one n-channel and p-channel transistor whose load paths (between the two load outputs) are connected in series with one another. The control terminals of the n-channel and p-channel transistors are connected to the output of the differential amplifier 17. A resistor 23 is provided between the output of the differential amplifier 17 and the control terminals of the transistors 19, 20, and a resistor 22 is provided between the control terminals and the center tap 21, in order to reduce acceptance distortions of the driver stage 18. It is thereby possible to achieve a faster response and thus a higher dynamic range of the entire voltage stabilization circuit. The transistors 19, 20 of the driver stage 18 thus advantageously operate in the analog range of the current/voltage characteristic curve in order thereby to be able to better follow the dynamic range of the signal V1+VS affected by interference.

In the present exemplary embodiment, the driver stage 18 is equipped with MOSFET transistors. The driving of the MOSFETs 19, 20 of the driver stage 18 requires a relatively complicated drive circuit (not illustrated in FIG. 2) for providing a bias voltage or for temperature compensation. As an alternative, it is also possible to use a driver stage 18 of bipolar design since this enables the current flow to be controlled more directly.

The antiphase signal VG can be tapped off at the output of the driver circuit 18, i.e. at the center tap 21 of the load paths. A feedback path 25, in which a resistor 24 is arranged, is furthermore provided, via which the antiphase signal VG provided by the driver stage 18 on the output side is fed back as control signal into the negative input (−) of the differential amplifier 17.

The driver illustrated in FIG. 2 operates in a range of greater than 100 mA. For driving smaller signals, however, typically only an operational amplifier is used, which can also drive current signals in the mA range. The functionality of the driver stage 18 and of the differential amplifier 17 would then be integrated in a suitably designed operational amplifier.

The voltage supply 7 has a voltage source 26 with an internal resistor 27, with which a capacitor 28 is connected in parallel. The voltage supply 7, which is only connected to the second signal line 3, generates a supply voltage of 24 volts, for example, at its output, so that the two supply voltage inputs of the differential amplifier 17 and of the driver 18 are supplied with the supply potentials V−=0 volts and V+=24 volts.

The matching circuit 6 is realized only by a resistor 29 in the example in FIG. 2. This resistor 29 is fed the antiphase signal VG and generates the compensated output signal VK therefrom. The resistor 29 serves for the signal matching and the stability of the control loop and thus of the entire circuit for voltage stabilization 1. In this case, the losses caused by the resistor 29 are deliberately accepted in order to prevent the control loop from oscillating and thereby, becoming unstable.

Figure 3:
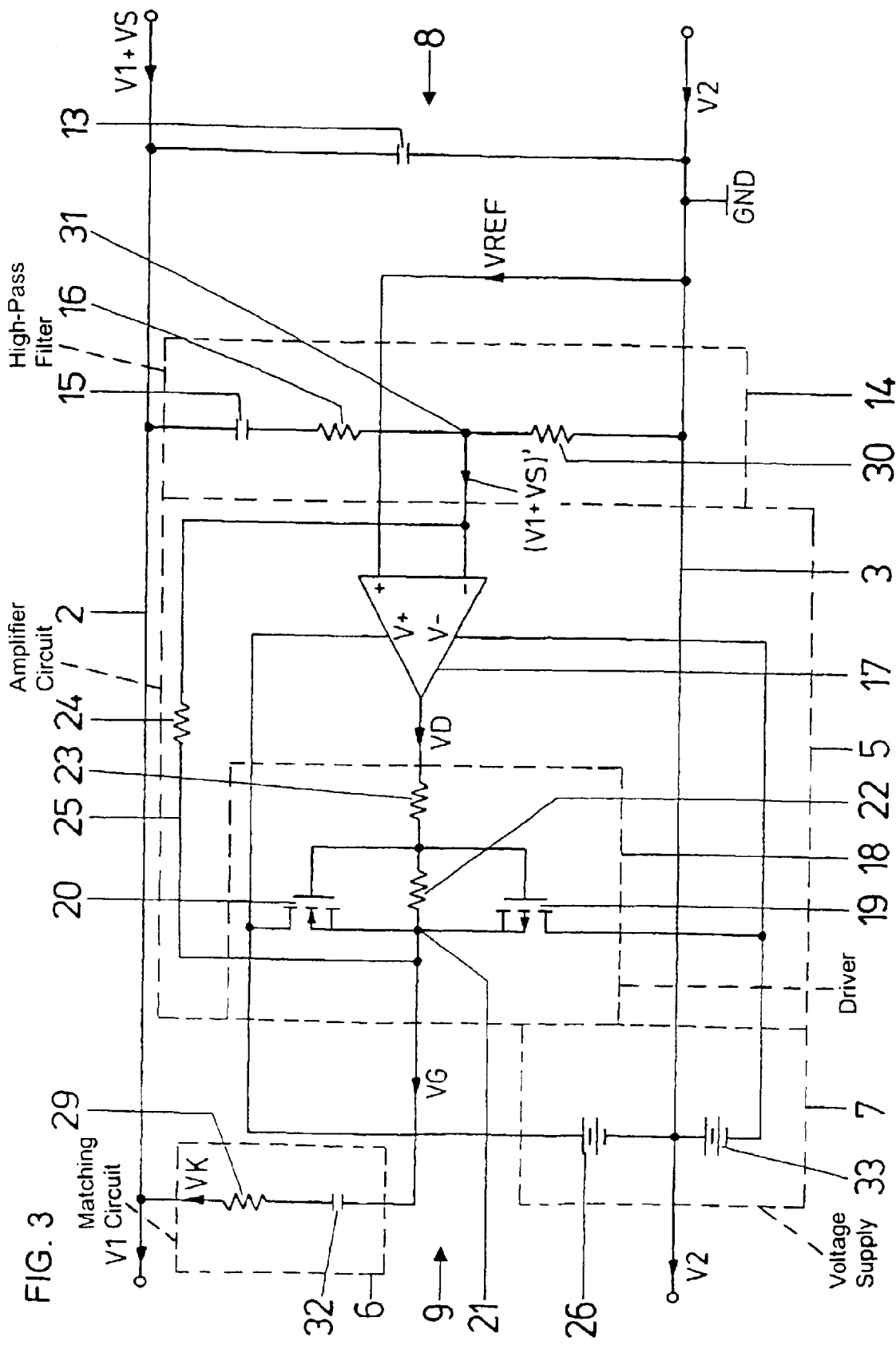
FIG. 3 is a circuit diagram of a second exemplary embodiment of the circuit for voltage stabilization.

FIG. 3 shows a circuit 1 with voltage sources arranged symmetrically relative to a reference potential.

The essential difference between the circuit for voltage stabilization 1 in accordance with FIG. 3 and that in FIG. 2 consists in the symmetrical design of the voltage supply 7. In this case, the voltage supply 7 has two voltage sources 26, 33 arranged symmetrically with regard to a reference potential GND. The reference-ground potential GND on the second signal line 3, which amounts to 0 volts is chosen as the reference potential in this case. The driver 18 and the differential amplifier 17 are thus supplied in each case with two supply potentials V+, V− that are identical in terms of magnitude but are provided with different signs, for example ±12 volts. Because of the symmetrical design of the voltage supply 7 with the two voltage sources 26, 33, the circuit for voltage stabilization 1 can be arranged between two arbitrary signal lines 2, 3, which means a higher flexibility. In particular, the signal lines 2, 3 thus need not necessarily have a rectified signal V1, V2, but rather an AC mains voltage could also be transmitted via the signal lines 2, 3.

Furthermore, in contrast to FIG. 2, the high-pass filter 14 in FIG. 3 is configured slightly differently and in this case also has a second resistor 30 in addition to the capacitor 15 and the resistor 16. The signal (V1+VS)' derived from the signal V1+VS affected by interference is able to be tapped off at the center tap 31 between the two resistors 16, 30.

The reference signal VREF coupled into the positive input of the differential amplifier 17 is in this case obtained directly from the reference signal GND of the second signal line 3. Consequently, a low-pass filter provided specially for this, as in FIG. 2, is not necessary here.

Furthermore, the matching circuit 6 is developed in such a way that a decoupling capacitor 32 is connected upstream of the resistor 29. This capacitor 32 decouples DC components and, if appropriate, the fundamental frequencies of the mains signals of the line to be compensated from the compensation circuit from the antiphase signal VG and thus ensures quasi freedom from potential for the entire circuit for voltage stabilization 6. By suitably dimensioning the decoupling capacitor 32, the dynamic range and thus the rising edge of the compensation current VK generated on the output side cannot be influenced.

Figure 4:
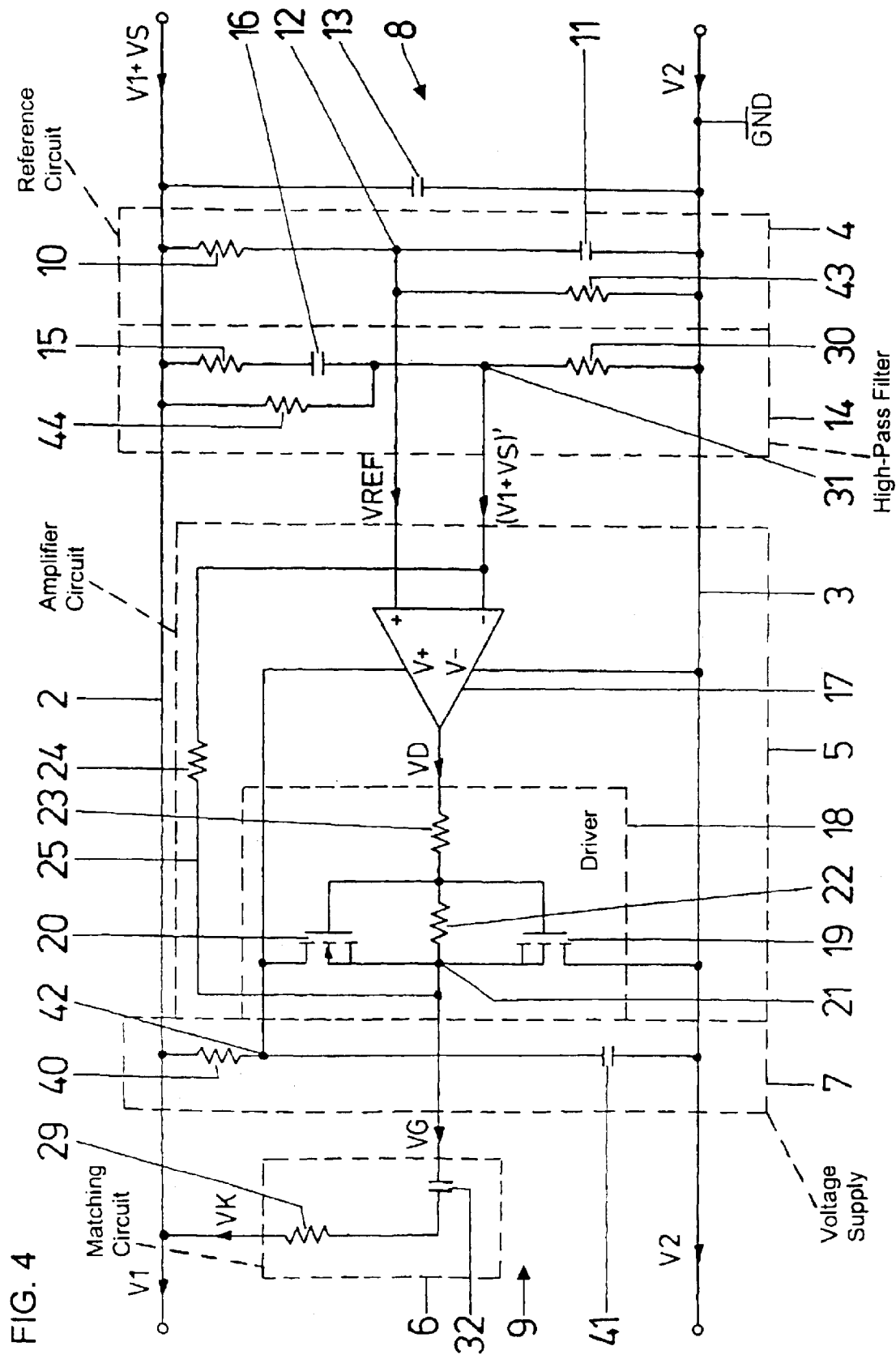
FIG. 4 is a circuit diagram of a third exemplary embodiment of the circuit for voltage stabilization.

FIG. 4 shows a further refinement of the circuit for voltage stabilization 1, in which the voltage supply 7 does not have an additional voltage source. In contrast to the exemplary embodiments of FIGS. 2 and 3, a current source is used for the energy supply of the driver stage 18 and of the differential amplifier 17. In the simplest case, the current source—as is illustrated in FIG. 4—contains a resistor 40 connected in series with a capacitor 41. This series circuit is arranged between the signal lines 2, 3. Consequently, a positive supply potential V+ for the energy supply of the driver 18 and differential amplifier 17 can be tapped off at the center tap 42. The driver 18 and the differential amplifier 17 receive the negative supply potential V- from the second signal line 3, which is at the reference ground GND potential. It goes without saying that the current source, which is designed as a resistor 40 and is illustrated in greatly simplified fashion in FIG. 4, could also be replaced by a controlled MOSFET. A current source of whatever design could generally be used here.

Instead of a voltage source or a current source, a compensated switched-mode power supply, charge pump or the like could also be used as voltage supply 7.

Furthermore, in contrast to FIG. 2, both the low-pass filter of the reference circuit 4 and the high-pass filter 14 are of multistage design. The low-pass filter has an additional resistor 43, connected in parallel with the capacitor 11, in addition to the series circuit formed by the resistor 10 and the capacitor 11. By virtue of the higher-order filter thereby provided, the latter has a greater transconductance at the limiting frequency. Only a low-pass filter of two-stage design has been presented in the present exemplary embodiment, but in the context of expert action and knowledge, it goes without saying that the filter could be extended in any desired manner and, in particular, could also include more than two stages.

Furthermore, the high-pass filter 14 connected upstream of the negative input of the differential amplifier 17 is also of multistage design. In addition to the series-connected resistor 15, capacitor 16 and resistor 30, a further resistor 44 is provided, which is connected in parallel with the series circuit formed by resistor 15 and capacitor 16.

To summarize, it may be stated that the circuit configuration for voltage stabilization 1 provides, in a very simple, but nonetheless very effective manner, perturbation-free and highly dynamic compensation of interference signals in the power current path of an electronic circuit without having to accept the disadvantages of known circuits for voltage stabilization, in particular the negative feedback.

We claim:

1. A voltage stabilization circuit, comprising:
   a first signal line for carrying a signal superimposed with an interference signal;
   a second signal line for carrying a signal;
   an amplifier circuit for generating an antiphase signal from a difference between a stabilized reference signal and a signal derived from said interference signal, said antiphase signal being in phase opposition with respect to said interference signal, said amplifier circuit including a first input;
   an active matching circuit for potential matching, said matching circuit connected downstream from said amplifier circuit, said matching circuit for generating a compensation signal from said antiphase signal, said compensation signal being superposed on said signal superimposed with said interference signal; and
   a reference circuit for generating said stabilized reference signal, said reference circuit connected upstream from said amplifier circuit, said reference circuit designed as a low-pass filter connected between said first signal line and said second signal line, said reference circuit including a center tap connected to said first input of said amplifier circuit for providing said stabilized reference signal to said first input of said amplifier circuit;
   said low-pass filter designed as a multistage filter or as a higher-order filter.

2. The circuit according to claim 1, further comprising:
   a high-pass filter coupled at least to said first signal line;
   said high-pass filter providing said signal derived from said interference signal.

3. The circuit according to claim 1, further comprising:
   a capacitor for filtering out potential spikes of said signal superimposed with said interference signal on said first signal line and for filtering out potential spikes of said signal on said second signal line; and
   an input configured with said capacitor.

4. The circuit according to claim 1, wherein said amplifier circuit includes a differential amplifier and a driver connected downstream from said differential amplifier.

5. The circuit according to claim 4, wherein said driver is a push-pull driver of bipolar design or a push-pull driver designed using MOS technology.

6. The circuit according to claim 1, wherein said amplifier circuit includes an operational amplifier functioning as a differential amplifier and a driver.

7. The circuit according to claim 1, further comprising:
   a feedback path;
   said amplifier circuit including a second input; and
   said feedback path feeding said antiphase signal into said second input of said amplifier circuit as a controlled variable.

8. The circuit according to claim 1, wherein:
   said matching circuit includes a resistor and a decoupling capacitor connected to said resistor upstream of said resistor;
   said interference signal has an amplitude and a sign;
   said resistor is dimensioned for generating said compensation signal from the said antiphase signal generated by said amplifier circuit; and
   said compensation signal corresponds to said amplitude of said interference signal and has a sign that is opposite said sign of said interference signal.

9. The circuit according to claim 1, further comprising:
   a voltage supply for supplying said amplifier circuit with a supply voltage.

10. The circuit according to claim 9, wherein said voltage supply is a voltage source with an internal resistor.

11. The circuit configuration according to claim 9, wherein:
   said voltage supply obtains or provides a reference potential;

said voltage supply has at least two voltage sources that are symmetrically configured relative to said reference potential; and said two voltage sources supply said amplifier circuit with supply potentials having identical magnitudes and opposite signs.

12. The circuit according to claim 9, wherein:

said voltage supply is configured as a current source connected between said first signal line and said second signal line;

said current source having an output providing at least one supply potential to said amplifier circuit.

13. The circuit according to claim 9, wherein:

said voltage supply is a compensated switched-mode power supply or a charge pump.

14. The circuit according to claim 1, further comprising:

a voltage supply for supplying said amplifier circuit with a supply voltage;

said amplifier circuit including a differential amplifier and driver.

* * * * *